(12) United States Patent
Lei et al.

(10) Patent No.: US 12,344,789 B2
(45) Date of Patent: Jul. 1, 2025

(54) ALUMINUM PHOSPHITE-BASED COMPLEX WITH DUAL-PEAK THERMAL GRAVITY DECOMPOSITION CHARACTERISTICS AND PREPARATION METHOD AND USE THEREOF

(71) Applicants: JIANGSU LISIDE NEW MATERIAL CO., LTD., Taizhou (CN); ZHEJIANG UNIVERSITY, Hangzhou (CN)

(72) Inventors: Hua Lei, Hangzhou (CN); Jinzhong Li, Taizhou (CN)

(73) Assignees: JIANGSU LISIDE NEW MATERIAL CO., LTD., Taizhou (CN); ZHEJIANG UNIVERSITY, Hangzhou (CN)

( * ) Notice: Subject to any disclaimer, the term of this patent is extended or adjusted under 35 U.S.C. 154(b) by 515 days.

(21) Appl. No.: 17/777,994

(22) PCT Filed: Feb. 4, 2021

(86) PCT No.: PCT/CN2021/075171
§ 371 (c)(1),
(2) Date: May 18, 2022

(87) PCT Pub. No.: WO2022/095294
PCT Pub. Date: May 12, 2022

(65) Prior Publication Data
US 2023/0015188 A1    Jan. 19, 2023

(30) Foreign Application Priority Data
Nov. 6, 2020    (CN) .......................... 202011230652.6

(51) Int. Cl.
*C09K 21/04*    (2006.01)
*C01B 25/36*    (2006.01)
(Continued)

(52) U.S. Cl.
CPC .............. *C09K 21/04* (2013.01); *C01B 25/36* (2013.01); *C08J 5/043* (2013.01); *C08J 5/10* (2013.01);
(Continued)

(58) Field of Classification Search
CPC .......... C09K 21/04; C01B 25/36; C08J 5/043; C08J 5/10; C08K 3/32; C08K 5/5313
See application file for complete search history.

(56) References Cited

U.S. PATENT DOCUMENTS 9,765,204 B2    9/2017    Timberlake et al.

FOREIGN PATENT DOCUMENTS

| CN | 104093663 | 10/2014 |
|----|-----------|---------|
| CN | 104114485 | 10/2014 |

(Continued)

*Primary Examiner* — John E Uselding
(74) *Attorney, Agent, or Firm* — Jiwen Chen; Joywin IP Law PLLC

(57) ABSTRACT

The present disclosure provides an aluminum phosphite-based complex with dual-peak thermal gravity decomposition characteristics and a preparation method and use thereof. A structural formula of the complex is as follows: $((HPO_3)_3Al_2)\cdot((H_2PO_3)_3Al)_x$, wherein x is 0.01-0.5 and represents a molar ratio of $(H_2PO_3)_3Al$ to $(HPO_3)_3Al_2$. The dual-peak thermal gravity decomposition characteristics are as follows: a first gravity peak temperature is 460-490° C., and a second gravity peak temperature is 550-580° C. The preparation method includes: uniformly mixing aluminum phosphite and aluminum hydrogen phosphite according to the ratio in the structural formula, and then performing stepwise heating at a rate of 5° C./min to raise the temperature of a mixture from the normal temperature to no more than 350° C. within 1-10 hours, so as to obtain the aluminum phosphite-based complex with the dual-peak thermal gravity decomposition characteristics. The complex may serve as or (Continued)

is configured to prepare a flame retardant or a flame-retardant synergist.

14 Claims, 2 Drawing Sheets

(51) Int. Cl.
  *C08J 5/04* (2006.01)
  *C08J 5/10* (2006.01)
  *C08K 3/32* (2006.01)
  *C08K 5/5313* (2006.01)

(52) U.S. Cl.
  CPC .............. *C08K 3/32* (2013.01); *C08K 5/5313* (2013.01); *C01P 2002/88* (2013.01); *C01P 2004/61* (2013.01); *C01P 2004/62* (2013.01); *C01P 2006/11* (2013.01); *C01P 2006/22* (2013.01); *C01P 2006/82* (2013.01); *C08J 2377/06* (2013.01); *C08K 2003/327* (2013.01)

(56) References Cited

FOREIGN PATENT DOCUMENTS

| | | |
|---|---|---|
| CN | 104736549 | 6/2015 |
| CN | 105452264 | 3/2016 |
| CN | 107828207 | 3/2018 |
| CN | 109824939 | 5/2019 |
| WO | WO2020132075 | 10/2020 |

ALUMINUM PHOSPHITE-BASED COMPLEX WITH DUAL-PEAK THERMAL GRAVITY DECOMPOSITION CHARACTERISTICS AND PREPARATION METHOD AND USE THEREOF

This is a U.S. national stage application of PCT Application No. PCT/CN2021/075171 under 35 U.S.C. 371, filed Feb. 4, 2021 in Chinese, claiming priority to Chinese Patent Applications No. 202011230652.6, filed Nov. 6, 2020, all of which are hereby incorporated by reference.

FIELD OF TECHNOLOGY

The present disclosure relates to the technical field of flame-retardant materials, in particular to an aluminum phosphite-based complex with dual-peak thermal gravity decomposition characteristics and a preparation method and use thereof.

BACKGROUND TECHNOLOGY

A thermal gravity peak temperature is an important indicator of a flame retardant, which refers to a temperature when the gravity is fastest in thermal gravity (TG) testing, and at this time, the flame retardant is decomposed in a fastest manner. This indicator involves many aspects of flame-retardant properties, processing and use of the flame retardant.

The flame retardant has a flame-retardant effect, and needs to be rapidly decomposed to release chemical components that inhibit combustion to extinguish flames. Therefore, as the flame retardant, it must have a suitable rapid decomposition temperature, that is, a decomposition peak temperature. If the peak temperature is close to an ignition and combustion temperature of a polymer material, both flame retarding and processing are taken into account. If the peak temperature is too high, the flame retardant will not work without rapid decomposition when the material is combusted, thereby losing the flame-retardant effect. From the perspective of the flame retarding, the lower the decomposition peak temperature is, the better the flame-retardant effect occurs in an early stage of material ignition, which is beneficial to the flame retarding. However, if the decomposition temperature of the flame retardant is too low, the flame retardant will be decomposed and loses the flame-retardant effect as it is subjected to a high temperature during the processing and molding of the material. Therefore, flame retardants all have a decomposition peak temperature that matches with the ignition temperature of the flame-retarded polymer material.

Usually, a flame-retardant compound has only a thermal gravity peak temperature. According to actual conditions of a fire and a thermal decomposition mechanism of the flame retardant, it is hoped that the flame retardant may have multiple thermal gravity peak temperatures. The flame retardant acts in multiple stages, thereby providing flame-retardant protection for a polymer at multiple temperature stages, effectively improving the flame-retardant property, reducing its dosage, and adapting to a wider range of processing temperature conditions. In addition, in some cases, there is still smoldering combustion without the flames after the flames are extinguished. At this time, the material is subjected to a high temperature, a secondary flame-retardant protection effect of the flame retardant at the high temperature is required, and the flame retardant is also required to be rapidly decomposed at a higher temperature in addition to a lower temperature.

At present, aluminum phosphite, because of its good flame-retardant synergy with aluminum diethylphosphinate and its lower water solubility and acidity, is widely used as a flame-retardant synergist in glass fiber reinforced engineering plastics, such as polyamide, polyester and other systems, and has better flame retardancy. However, the aluminum phosphite reported so far, with a thermal gravity curve as shown in FIG. 1, only has a single-peak thermal gravity temperature characteristic, so there are still problems of a slight shortage of the flame-retardant property in use, slightly long delayed combustion time during the secondary ignition in UL testing, and a large addition amount. This limits the application range of a flame retardant system. Aluminum hydrogen phosphite is similar in structure to the aluminum phosphite, is a water-soluble compound although it can produce the flame-retardant effect, and may not be used as the flame retardant due to a lower decomposition temperature.

To improve the flame-retardant property of the aluminum phosphite, the present disclosure provides an aluminum phosphite-based complex with dual-peak thermal gravity decomposition characteristics, and will provide a synthesis method for preparing the complex and a use of the complex as the flame-retardant synergist in flame retarding of the polymer material.

SUMMARY OF THE INVENTION

In view of the above-mentioned technical problems and deficiencies in the art, the present disclosure provides an aluminum phosphite-based complex with dual-peak thermal gravity decomposition characteristics. The complex has the dual-peak thermal decomposition temperature characteristics, which is beneficial to flame-retardant protection of a material after ignition and prevention of secondary combustion and smoldering combustion without open flames, may also serve as a flame-retardant synergist to cooperate with aluminum diethylphosphinate, has better flame-retardant property, is used for a halogen-free flame-retardant component of the polymer material, and is used as a flame-retardant system of glass fiber reinforced engineering plastics.

An aluminum phosphite-based complex with dual-peak thermal gravity decomposition characteristics, a structural formula being as follows:

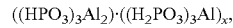

where x is 0.01-0.5 and represents a molar ratio of $(H_2PO_3)_3Al$ to $(HPO_3)_3Al_2$; and
the dual-peak thermal gravity decomposition characteristics are as follows: a first gravity peak temperature is 460-490° C., and a second gravity peak temperature is 550-580° C.

The complex of the present disclosure has the dual-peak thermal gravity characteristics as seen from a thermal gravity (TG) result. However, the aluminum phosphite $((HPO_3)_3Al_2)$ currently used in the field of flame retardants has a typical TG curve as shown in FIG. 1. There is only a single-peak thermal gravity characteristic on the curve. Except for the existence of a low-temperature thermal decomposition peak similar to a first gravity peak of the complex of the present disclosure, there is no high-temperature decomposition peak of the complex of the present disclosure. In the complex of the aluminum phosphite and aluminum hydrogen phosphite obtained by the present disclosure, dual peaks of its thermal gravity curve are not a superposition of respective thermal decomposition peaks of the aluminum phosphite and the aluminum hydrogen phosphite. The aluminum hydrogen phosphite (($H_2PO_3$)$_3$Al), with a thermal gravity curve as shown in FIG. 2, has only a decomposition peak temperature of about 316° C. Meanwhile, the aluminum phosphite and the aluminum hydrogen phosphite are simply mixed, and a measured thermal gravity curve is as shown in FIG. 3, which shows a superposition of respective thermal gravity characteristics of the aluminum phosphite and the aluminum hydrogen phosphite. In the complex of the present disclosure, the low peak temperature of about 316° C. disappears. Apparently, a substance obtained by the present disclosure is a new complex of the aluminum phosphite and the aluminum hydrogen phosphite, which is not a simple mixture of the two, with a new structure.

Through experimental research by the inventor, to obtain the complex with the dual-peak thermal gravity characteristics, the molar ratio of the aluminum phosphite to the aluminum hydrogen phosphite is 1:(0.01-0.5). An excessively high proportion of the aluminum phosphite will obtain a single-peak thermal gravity characteristic close to that of the aluminum phosphite. An excessively low proportion of the aluminum phosphite will obtain a single-peak thermal gravity characteristic close to that of the aluminum hydrogen phosphite or present dual-peak gravity characteristics of the simple mixture of the aluminum phosphite and the aluminum hydrogen phosphite. But there are no high-temperature thermal gravity characteristic peaks of 550-580° C. in the present disclosure. Therefore, the dual-peak thermal gravity characteristics of the present disclosure may not be realized.

In addition to having a first peak temperature close to that of the aluminum phosphite, the complex with the dual-peak thermal decomposition characteristics in the present disclosure also has a higher second peak temperature, but does not have a lower characteristic peak temperature of the aluminum hydrogen phosphite. Unlike simple mixing of the aluminum phosphite and the aluminum hydrogen phosphite, the new complex has dual-peak decomposition temperatures, which is beneficial for use as a flame retardant. Moreover, the complex is obviously superior to the aluminum phosphite, the aluminum hydrogen phosphite and the simple mixture of the two in performances such as a water absorption rate and a pH value, which indicates that the substance obtained by the present disclosure is the new complex of the two, instead of the mixture of the aluminum phosphite and the aluminum hydrogen phosphite. Through testing and use, the aluminum phosphite-based complex with the dual-peak decomposition characteristics still has a synergistic flame-retardant effect with the aluminum diethylphosphinate, with the flame-retardant efficiency improved to a certain extent compared with the aluminum phosphite.

In the aluminum phosphite-based complex with the dual-peak thermal gravity decomposition characteristics, pH is not lower than 3, a particle size is 0.1-1000 μm, the solubility in water is 0.01-10 g/L, the bulk density is 80-800 g/L, and the residual moisture is 0.1-5 wt %.

The present disclosure further provides a preferred preparation method of the aluminum phosphite-based complex with the dual-peak thermal gravity decomposition characteristics, including: uniformly mixing the aluminum phosphite and the aluminum hydrogen phosphite according to the ratio in the structural formula, and then performing stepwise heating at a rate of 5° C./min to raise the temperature of the mixture from the normal temperature to no more than 350° C. within 1-10 hours, so as to obtain the aluminum phosphite-based complex with the dual-peak thermal gravity decomposition characteristics.

The complex of the present disclosure is obtained from the aluminum phosphite and the aluminum hydrogen phosphite in a certain proportion through a special high-temperature treatment process. The materials subjected to high-temperature treatment may be further pulverized to the required particle size.

From the result, it may be seen that the aluminum phosphite and the aluminum hydrogen phosphite may have a chemical interaction at a high temperature, thereby forming the new complex; and thermal decomposition shows respective characteristic decomposition of the two different substances subjected to compounding. In principle, there is no chemical reaction between the two compounds, but a new result appears in thermal gravity, and some coordination bonds and hydrogen bonds may be formed between the two substances, thereby forming the new complex, and changing the thermal decomposition characteristics.

Preferably, three heat preservation platforms, being 160° C., 220° C. and 280° C. respectively, are set during the stepwise heating, and heat preservation time is independently 30-60 min.

The present disclosure further provides a use of the aluminum phosphite-based complex with the dual-peak thermal gravity decomposition characteristics. The complex may be used as a flame retardant for a varnish and a foam coating, a flame retardant for wood and other cellulose-containing products and a non-reactive flame retardant for a polymer, is configured to prepare a flame-retardant polymeric molding material, a flame-retardant polymer molded body and/or endow polyester and cellulose pure and hybrid fabrics with flame retardancy by impregnation, and serves as a flame retardant mixture and a flame-retardant synergist.

The complex serves as or is configured to prepare the flame retardant or the flame-retardant synergist, and is configured to:

perform flame retarding of the varnish or the foam coating;

perform flame retarding of the wood or the cellulose-containing product; and prepare the flame-retardant polymeric molding material, the flame-retardant polymer film, and the flame-retardant polymer fiber.

Preferably, the flame-retardant polymeric molding material, the flame-retardant polymer film, and the flame-retardant polymer fiber, based on the total weight of 100%, each comprises:

55-99.9% of a polymer matrix, 0.1-45% of the aluminum phosphite-based complex with the dual-peak thermal gravity decomposition characteristics, 0-44.9% of a filler or a reinforcing material, and 0-44.9% of an additive.

Preferably, the flame-retardant polymeric molding material, the flame-retardant polymer film, and the flame-retardant polymer fiber, based on the total weight of 100%, each comprises:

55-99.9% of the polymer matrix, 0.1-45% of the flame-retardant system, 0-44.9% of the filler or the reinforcing material, and 0-44.9% of the additive; and the flame-retardant system comprises
0.1-50% of the aluminum phosphite-based complex with the dual-peak thermal gravity decomposition characteristics, and
50-99.9% of the flame retardant.

The flame retardant may be dialkyl hypophosphorous acid and/or salt thereof; a condensation product of melamine and/or a reaction product of the melamine and phosphoric acid and/or a reaction product of the condensation product of the melamine and polyphosphoric acid or a mixture thereof; nitrogen-containing phosphate; benzoguanamine, tris (hydroxyethyl) isocyanurate, allantoin, glycoluril, melamine, melamine cyanurate, dicyandiamide and/or guanidine; and magnesium oxide, calcium oxide, aluminum oxide, zinc oxide, manganese oxide, tin oxide, aluminum hydroxide, boehmite, dihydrotalcite, hydrocalumite, magnesium hydroxide, calcium hydroxide, zinc hydroxide, tin oxide hydrate, manganese hydroxide, zinc borate, alkaline zinc silicate and/or zinc stannate.

The flame retardant may also be melam, melem, melon, dimelamine pyrophosphate, melamine polyphosphate, melam polyphosphate, melon polyphosphate and/or melem polyphosphate and/or mixed polysalt thereof and/or ammonium hydrogen phosphate, ammonium dihydrogen phosphate and/or ammonium polyphosphate.

The flame retardant further may be aluminum hypophosphite, zinc hypophosphite, calcium hypophosphite, sodium phosphite, monophenyl hypophosphorous acid and salt thereof, a mixture of dialkyl hypophosphorous acid and salt thereof and monoalkyl hypophosphorous acid and salt thereof, 2-carboxyethyl alkyl hypophosphorous acid and salt thereof, 2-carboxyethyl methyl hypophosphorous acid and salt thereof, 2-carboxyethyl aryl hypophosphorous acid and salt thereof, 2-carboxyethyl phenyl hypophosphorous acid and salt thereof, DOPO and salt thereof and an adduct on p-benzoquinone.

The flame retardant is preferably the aluminum diethylphosphinate.

The polymer matrix is selected from at least one of polyamide, polyester, and polyketone (POK).

When the flame-retardant system obtained by compounding the complex and the aluminum diethylphosphinate is used in the glass fiber reinforced engineering plastics, high-temperature melting by a twin-screw extruder, mixing and dispersion need to be performed.

Compared with the prior art, the present disclosure has the following main advantages: the aluminum phosphite-based complex with the dual-peak thermal gravity decomposition characteristics is provided. The preparation method is simple. The complex has the dual-peak thermal decomposition temperature characteristics, and compared with amorphous aluminum phosphite, has one more high-temperature gravity peak and a higher thermal decomposition temperature, which is beneficial to flame-retardant protection of the material after ignition and prevention of secondary combustion and smoldering combustion without open flames. Moreover, the complex may also serve as the flame-retardant synergist to cooperate with the aluminum diethylphosphinate, has the better flame-retardant property, is used for the halogen-free flame-retardant component of the polymer material, and is used as the flame-retardant system of the glass fiber reinforced engineering plastics.

DETAILED DESCRIPTION OF THE EMBODIMENTS

Figure 1:
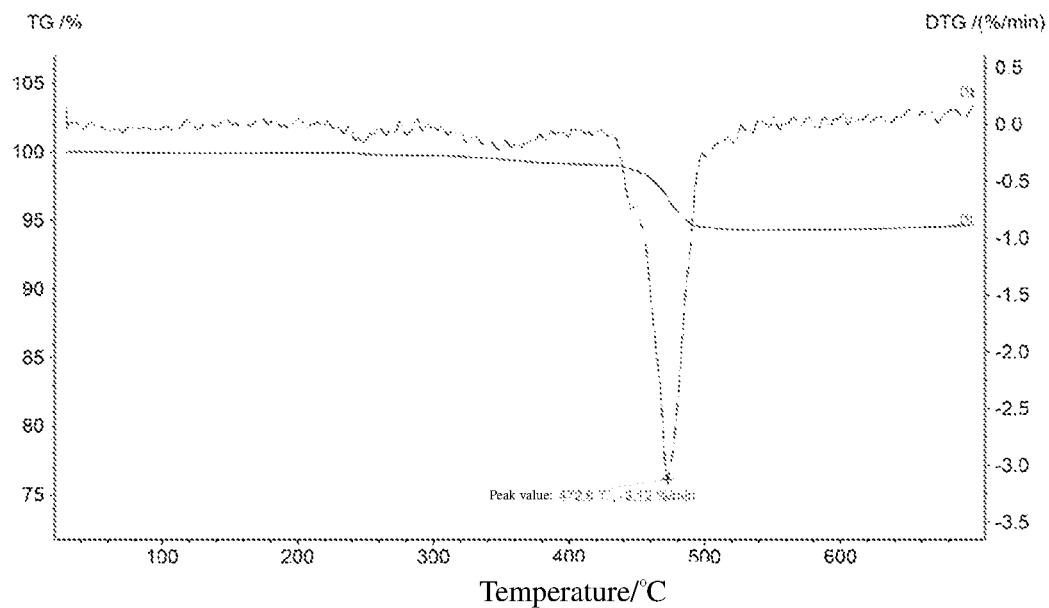
FIG. 1 is a thermal gravity curve chart of aluminum phosphite.

The present disclosure is further described below with reference to the accompanying drawings and specific examples. It should be understood that these examples are merely used to illustrate the present disclosure and not to limit the scope of the present disclosure. In the following examples, operation methods without specific conditions are usually in accordance with conventional conditions or conditions suggested by the manufacturer.

Example 1 Preparation of Aluminum Phosphite-Based Complex with Dual-Peak Thermal Gravity Decomposition Characteristics A preparation method was as follows: 294 g (1 mol) of aluminum phosphite and 54 g (0.2 mol) of aluminum hydrogen phosphite were weighed respectively and mixed uniformly in a crucible. The crucible was put into an oven, the temperature was raised to 160° C. at a rate of 2° C./min and held for 30 min, the temperature was raised to 220° C. at a rate of 1° C./min and held for 60 min, the temperature was raised to 280° C. at a rate of 2° C./min and held for 60 min, the temperature was reduced to the room temperature, the materials were discharged and pulverized according to an average particle size D50 being 42 μm, and relevant testing and use were performed.

Testing Items and Methods:
(1) For the complex: a thermal gravity analysis (TGA) was tested, a heating rate was 20° C./min, and a nitrogen atmosphere was used. Through a differential curve (DTG) of TGA, a gravity peak temperature was obtained, and the complex of the present disclosure showed dual peaks on the curve of TGA, thereby achieving the objective of the present disclosure.
(2) Flame-retardant testing and use of the complex: testing was performed according to UL94 V0 standards: five samples were tested, and each sample was ignited twice; the sample was ignited for 10 s each time and then left flames, and the sample was required to be extinguished within 10 s for which the sample left the flames; total after-flame time of the five samples ignited for ten times in total was not more than 50 s; it was stipulated that the sample was not combusted and did not drip during the ignition; and if the sample was not completely combusted, smoldering combustion without the flames for more than 30 s might not occur after ignition. On the premise that the total after-flame time satisfied the standard requirements, extinguishing time of secondary ignition of each sample was compared, and the shorter the extinguishing time of the secondary ignition was, the better the high-temperature flame-retardant protection effect of a flame retardant was.
(3) testing of a water absorption rate: certain materials were weighed and put into a constant temperature and humidity box of 85% humidity and 20° C. for 7 days (168 hours), and the materials were taken out and weighed, where increased weight was the weight of absorbed water, and the weight of the absorbed water was divided by the weight of the initial materials to obtain the water absorption rate.

(4) a pH testing method: 10 g of flame retardant powder was weighed and dispersed in 100 g of deionized water, stirring was performed at a constant temperature of 20° C. for 2 hours, the powder was filtered, and a pH value of a filtrate was measured with a pH meter.

Figure 4:
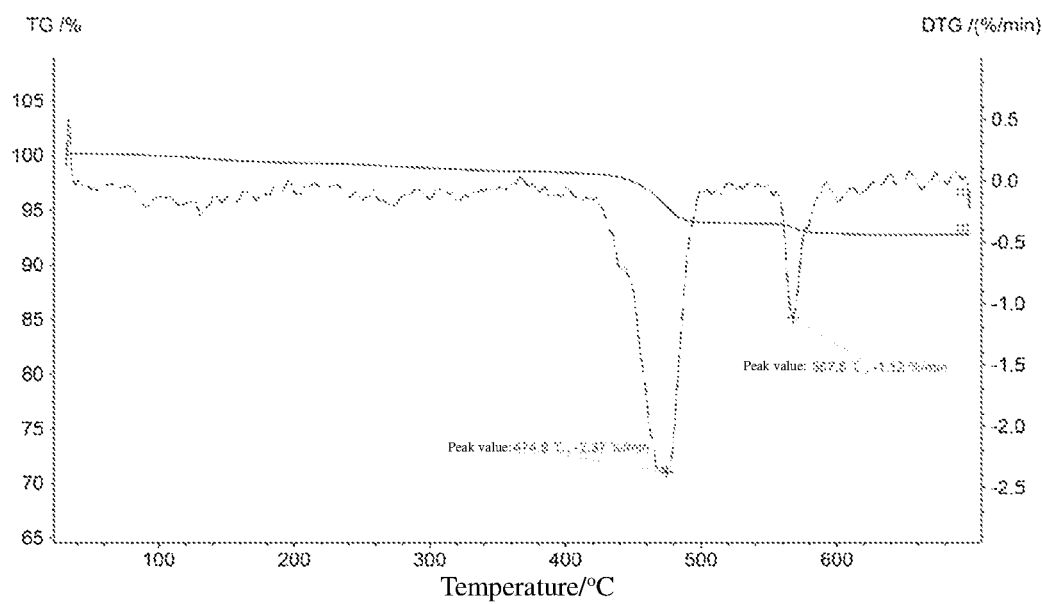
FIG. 4 is a thermal gravity curve chart of an aluminum phosphite-based complex with dual-peak thermal gravity decomposition characteristics prepared in an embodiment 1.

FIG. 4 illustrated a TGA result of the dual-peak thermal gravity complex prepared in this example. The thermal gravity, the water absorption rate and the pH value were as shown in a table 1.

Comparative Example 1

It was the same as the example 1. Except that aluminum hydrogen phosphite was not used, other preparation processes were the same. Materials were obtained, and TGA was tested. A result was as shown in FIG. 1 and showed a single peak. A water absorption rate and a pH value were tested, and a result was as shown in a table 1.

Comparative Example 2

Figure 2:
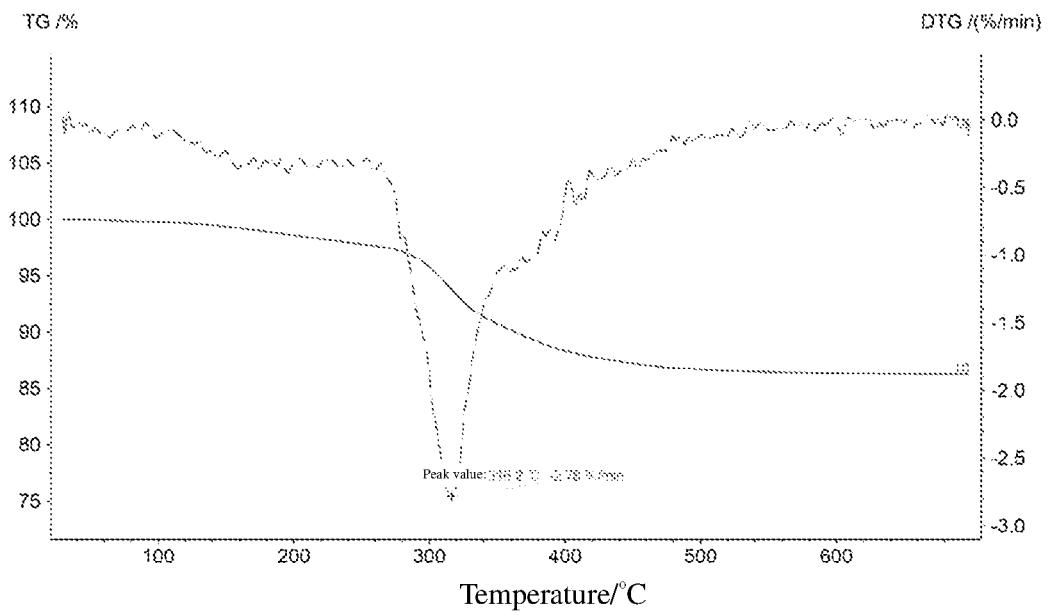
FIG. 2 is a thermal gravity curve chart of aluminum hydrogen phosphite.

It was the same as the example 1. Except that aluminum hydrogen phosphite was not used, other preparation processes were the same. Materials were obtained, and TGA was tested. A result was as shown in FIG. 2 and showed a single peak. A water absorption rate and a pH value were tested, and a result was as shown in a table 1.

Comparative Example 3

It was the same as the example 1. Except that a molar ratio of aluminum hydrogen phosphite to aluminum phosphite was 1:0.6, other preparation processes were the same. Materials were obtained, and TGA was tested. A result showed dual peaks. A water absorption rate and a pH value were tested, and a result was as shown in a table 1.

Comparative Example 4

Figure 3:
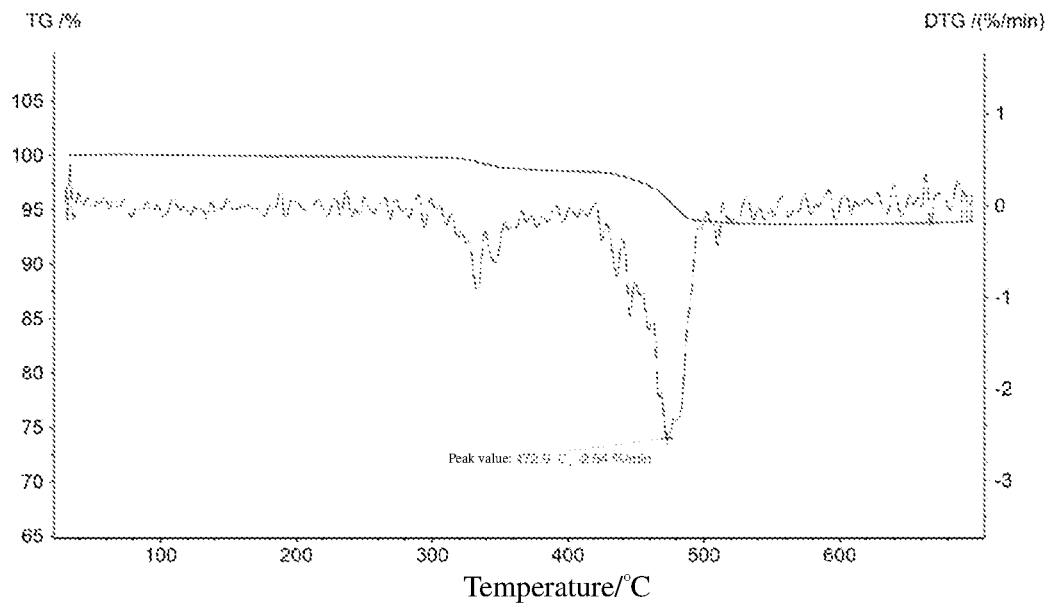
FIG. 3 is a thermal gravity curve chart of a simple mixture of the aluminum phosphite and the aluminum hydrogen phosphite.

Aluminum phosphite and aluminum hydrogen phosphite were mixed according to a ratio in the example 1, high-temperature post-treatment was not performed, and TGA was directly tested. A result was as shown in FIG. 3 and showed dual peaks. A water absorption rate and a pH value were tested, and a result was as shown in a table 1.

TABLE 1

| | First peak temperature (° C.) | Second peak temperature (° C.) | Water absorption rate (%) | pH value |
|---|---|---|---|---|
| Example 1 | 474.9 | 567.5 | 0.18 | 3.1 |
| Comparative Example 1 | 472.6 | — | 0.5 | 2.6 |
| Comparative Example 2 | 316.2 | — | >10 | <1 |
| Comparative Example 3 | 322.7 | 472.1 | >10 | <1 |
| Comparative Example 4 | 328.3 | 472.9 | >10 | <1 |

From the result in the Table 1, it may be seen that the prepared complex of the present disclosure has dual-peak thermal gravity characteristics, differing from single-peak thermal gravity characteristics of aluminum phosphite and aluminum hydrogen phosphite; and for a higher proportion of the aluminum hydrogen phosphite in mixing of the aluminum phosphite and the aluminum hydrogen phosphite as well as simple mixing of the aluminum phosphite and the aluminum hydrogen phosphite, the dual-peak thermal decomposition characteristics are also showed, but a superposition of thermal decomposition characteristic peaks of two kinds of mixtures is showed, and there are no high-temperature thermal decomposition peaks (namely, decomposition peaks of 550-580° C.). Compared with the samples in the comparative examples, the complex has different thermal decomposition characteristics as well as a higher thermal decomposition temperature, a lower water absorption rate and weaker acidity, indicating that the complex is one with a new structure; and meanwhile, these characteristics are obviously advantageous for use as a flame retardant.

Use of Flame Retardant

Example 2

50 wt % of polyamide 66, 30 wt % of glass fiber, 4 wt % of a dual-peak thermal decomposition complex prepared according to the example 1 and 16 wt % of aluminum diethylphosphinate (LFR8003, Jiangsu Liside New Materials Co., Ltd.) were used to prepare flame-retardant glass fiber reinforced polyamide 66 according to general processes, and the flame-retardant properties were tested by sample preparation. A test result was as shown in a table 2.

Example 3

52 wt % of polyamide 66, 30 wt % of glass fiber, 3.5 wt % of a dual-peak thermal decomposition complex prepared according to the example 1 and 14.5 wt % of aluminum diethylphosphinate (LFR8003, Jiangsu Liside New Materials Co., Ltd.) were used to prepare flame-retardant glass fiber reinforced polyamide 66 according to general processes, and the flame-retardant properties were tested by sample preparation. A test result was as shown in a table 2.

Comparative Example 5

50 wt % of polyamide 66, 30 wt % of glass fiber and 20 wt % of aluminum diethylphosphinate (LFR8003, Jiangsu Liside New Materials Co., Ltd.) were used to prepare flame-retardant glass fiber reinforced polyamide 66 according to general processes, and the flame-retardant properties were tested by sample preparation. A test result was as shown in a table 2.

Comparative Example 6

50 wt % of polyamide 66, 30 wt % of glass fiber, 4 wt % of a single-peak thermal decomposition sample prepared according to the comparative example 1 and 16 wt % of aluminum diethylphosphinate (LFR8003, Jiangsu Liside New Materials Co., Ltd.) were used to prepare flame-retardant glass fiber reinforced polyamide 66 according to general processes, and the flame-retardant properties were tested by sample preparation. A test result was as shown in a table 2.

Comparative Example 7

50 wt % of polyamide 66, 30 wt % of glass fiber, 4 wt % of a single-peak thermal decomposition sample prepared according to the comparative example 2 and 16 wt % of aluminum diethylphosphinate (LFR8003, Jiangsu Liside New Materials Co., Ltd.) were used to prepare flame-retardant glass fiber reinforced polyamide 66 according to general processes, and the flame-retardant properties were tested by sample preparation. A test result was as shown in a table 2.

Comparative Example 8

50 wt % of polyamide 66, 30 wt % of glass fiber, 4 wt % of a sample prepared according to the comparative example 3 and 16 wt % of aluminum diethylphosphinate (LFR8003, Jiangsu Liside New Materials Co., Ltd.) were used to prepare flame-retardant glass fiber reinforced polyamide 66 according to general processes, and the flame-retardant properties were tested by sample preparation. A test result was as shown in a table 2.

Comparative Example 9

50 wt % of polyamide 66, 30 wt % of glass fiber, 4 wt % of a sample prepared according to the comparative example 4 and 16 wt % of aluminum diethylphosphinate (LFR8003, Jiangsu Liside New Materials Co., Ltd.) were used to prepare flame-retardant glass fiber reinforced polyamide 66 according to general processes, and the flame-retardant properties were tested by sample preparation. A test result was as shown in a table 2.

Comparative Example 10

52 wt % of polyamide 66, 30 wt % of glass fiber, 3.5 wt % of a sample prepared according to the comparative example 4 and 14.5 wt % of aluminum diethylphosphinate (LFR8003, Jiangsu Liside New Materials Co., Ltd.) were used to prepare flame-retardant glass fiber reinforced polyamide 66 according to general processes, and the flame-retardant properties were tested by sample preparation. A test result was as shown in a table 2.

flame-retardant effect, thereby reflecting the advantages of the dual-peak thermal decomposition complex.

In addition, it should be understood that those skilled in the art may make various variations or modifications to the present disclosure after reading the above description of the present disclosure, and these equivalent forms also fall within the scope limited by the appended claims of the present disclosure.

The invention claimed is:

1. An aluminum phosphite-based complex exhibiting a dual-peak upon thermal gravimetric analysis, a structural formula being as follows:

$$((HPO_3)_3Al_2)\cdot((H_2PO_3)_3Al)_x,$$

wherein x is 0.01-0.5 and represents a molar ratio of $(H_2PO_3)_3Al$ to $(HPO_3)_3Al_2$.

2. The aluminum phosphite-based complex exhibiting a dual-peak upon thermal gravimetric analysis according to claim 1, wherein pH is not lower than 3, a particle size is 0.1-1000 μm, the solubility in water is 0.01-10 g/L, the bulk density is 80-800 g/L, and the residual moisture is 0.1-5 wt %.

3. A preparation method of the aluminum phosphite-based complex exhibiting a dual-peak upon thermal gravimetric analysis according to claim 1, comprising: uniformly mixing aluminum phosphite and aluminum hydrogen phosphite according to the ratio in the structural formula, and then performing stepwise heating at a rate of 5° C./min to raise the temperature of a mixture from a normal temperature to no more than 350° C. within 1-10 hours, so as to obtain the aluminum phosphite-based complex exhibiting a dual-peak upon thermal gravimetric analysis.

4. The preparation method according to claim 3, wherein three heat preservation platforms, being 160° C., 220° C. and 280° C. respectively, are set during the stepwise heating, and heat preservation time is independently 30-60 min.

5. A flame-retardant polymeric molding material, a flame-retardant polymer film, or flame-retardant polymer fiber,

TABLE 2

Detailed results of flame-retardant testing of different systems

| | Example 2 | Example 3 | Comparative Example 5 | Comparative Example 6 | Comparative Example 7 | Comparative Example 8 | Comparative Example 9 | Comparative Example 10 |
|---|---|---|---|---|---|---|---|---|
| t1(s) | 15 | 23 | 122 | 13 | 10 | 14 | 12 | 21 |
| t2(s) | 12 | 19 | 140 | 26 | 34 | 28 | 30 | 36 |
| t1 + t2 (s) | 27 | 42 | 262 | 39 | 44 | 42 | 42 | 57 |
| Whether to drip or not | Not | Not | Not | Not | Not | Not | Not | Not |
| V0 flame-retardant evaluation | PASS | PASS | FAIL | PASS | PASS | PASS | PASS | FAIL |

According to the use result, it may be seen that the dual-peak thermal decomposition complex of the present disclosure may cooperate with the aluminum diethylphosphinate to improve the flame-retardant effect, and may reduce the dosage of the flame retardant compared with the mixture. Meanwhile, compared with a single-component flame retardant of single-peak thermal decomposition and its simple mixture, during the cooperation with the aluminum diethylphosphinate, a flame-retardant grade of V0 may be all achieved under the same dosage, but the dual-peak thermal decomposition complex of the present disclosure has shorter delayed combustion time (t1+t2), especially shorter delayed combustion time (t2) of second ignition, with a better each comprising the aluminum phosphite-based complex exhibiting a dual-peak upon thermal gravimetric analysis according to claim 1.

6. The flame-retardant polymeric molding material, a flame-retardant polymer film, or flame-retardant polymer fiber according to claim 5, wherein the flame-retardant polymeric molding material, the flame-retardant polymer film, or the flame-retardant polymer fiber, based on the total weight of 100%, each comprises:
55-99.9% of a polymer matrix,
0.1-45% of the aluminum phosphite-based complex exhibiting a dual-peak upon thermal gravimetric analysis, 0-44.9% of a filler or a reinforcing material, and
0-44.9% of an additive.

7. The flame-retardant polymeric molding material, a flame-retardant polymer film, or flame-retardant polymer fiber according to claim 5, wherein the flame-retardant polymeric molding material, the flame-retardant polymer film, or the flame-retardant polymer fiber, based on the total weight of 100%, each comprises:
55-99.9% of a polymer matrix,
0.1-45% of a flame-retardant system,
0-44.9% of a filler or a reinforcing material, and
0-44.9% of an additive; and
the flame-retardant system comprises
0.1-50% of the aluminum phosphite-based complex exhibiting a dual-peak upon thermal gravimetric analysis, and
50-99.9% of a flame retardant.

8. The flame-retardant polymeric molding material, a flame-retardant polymer film, or flame-retardant polymer fiber according to claim 7, wherein the flame retardant is aluminum diethylphosphinate.

9. The flame-retardant polymeric molding material, a flame-retardant polymer film, or flame-retardant polymer fiber according to claim 6, wherein the polymer matrix is selected from at least one of polyamide, polyester, and polyketone (POK).

10. A preparation method of the aluminum phosphite-based complex exhibiting a dual-peak upon thermal gravimetric analysis according to claim 2, comprising: uniformly mixing aluminum phosphite and aluminum hydrogen phosphite according to the ratio in the structural formula, and then performing stepwise heating at a rate of 5° C./min to raise the temperature of a mixture from a normal temperature to no more than 350° C. within 1-10 hours, so as to obtain the aluminum phosphite-based complex exhibiting a dual-peak upon thermal gravimetric analysis.

11. A flame-retardant polymeric molding material, a flame-retardant polymer film, or flame-retardant polymer fiber, comprising the aluminum phosphite-based complex exhibiting a dual-peak upon thermal gravimetric analysis according to claim 2, wherein the complex serves as or is configured to prepare a flame retardant or a flame-retardant synergist, and the complex is configured to:
perform flame retarding of a varnish or a foam coating;
perform flame retarding of wood or a cellulose-containing product.

12. The flame-retardant polymeric molding material, a flame-retardant polymer film, or flame-retardant polymer fiber according to claim 7, wherein the polymer matrix is selected from at least one of polyamide, polyester, and polyketone (POK).

13. The flame-retardant polymeric molding material, a flame-retardant polymer film, or flame-retardant polymer fiber according to claim 8, wherein the polymer matrix is selected from at least one of polyamide, polyester, and polyketone (POK).

14. The aluminum phosphite-based complex according to claim 1, wherein the dual-peak shown by thermal gravimetric analysis are as follows: a first gravity peak temperature is 460-490° C., and a second gravity peak temperature is 550-580° C.

* * * * *